(12) United States Patent
Shinozaki et al.

(10) Patent No.: US 9,781,341 B2
(45) Date of Patent: Oct. 3, 2017

(54) IMAGE PROCESSING SYSTEM, INFORMATION PROCESSING DEVICE, INFORMATION STORAGE DEVICE, AND IMAGE PROCESSING METHOD

(71) Applicant: OLYMPUS CORPORATION, Shibuya-ku, Tokyo (JP)

(72) Inventors: Arata Shinozaki, Hachioji (KE); Mitsunori Kubo, Hachioji (JP); Takayuki Nakatomi, Chofu (JP)

(73) Assignee: OLYMPUS CORPORATION, Tokyo (JP)

( * ) Notice: Subject to any disclaimer, the term of this patent is extended or adjusted under 35 U.S.C. 154(b) by 478 days.

(21) Appl. No.: 14/165,113

(22) Filed: Jan. 27, 2014

(65) Prior Publication Data

US 2014/0139621 A1   May 22, 2014

Related U.S. Application Data

(63) Continuation of application No. PCT/JP2012/068054, filed on Jul. 17, 2012.

(30) Foreign Application Priority Data

Jul. 27, 2011   (JP) ................. 2011-164063

(51) Int. Cl.
*H04N 5/232* (2006.01)
*G06T 3/40* (2006.01)
*H04N 5/262* (2006.01)

(52) U.S. Cl.
CPC ....... *H04N 5/23238* (2013.01); *G06T 3/4038* (2013.01); *H04N 5/23232* (2013.01); *H04N 5/2624* (2013.01)

(58) Field of Classification Search
CPC ............. H04N 5/23238; H04N 5/2624; H04N 5/23232; H04N 5/232; G06T 3/4038
(Continued)

(56) References Cited

U.S. PATENT DOCUMENTS

| 6,243,103 B1* | 6/2001 | Takiguchi | ............. | G06T 3/4038 |
| | | | | 345/634 |
| 2002/0047895 A1* | 4/2002 | Bernardo | ............... | G01C 11/02 |
| | | | | 348/48 |

(Continued)

FOREIGN PATENT DOCUMENTS

| JP | 11-352568 A | 12/1999 |
| JP | 2008-289095 A | 11/2008 |

(Continued)

OTHER PUBLICATIONS

International Search Report (ISR) dated Sep. 25, 2012 (and English translation thereof) issued in counterpart International Application No. PCT/JP2012/068054.

(Continued)

*Primary Examiner* — Tung Vo
*Assistant Examiner* — Zaihan Jiang
(74) *Attorney, Agent, or Firm* — Holtz, Holtz & Volek PC

(57) ABSTRACT

An image processing system includes an image acquisition section that consecutively acquires still images, a direction determination section that determines a camera moving direction that is a moving direction of an imaging section during capture, and a panoramic image generation section that performs a synthesis process of the consecutively acquired still images to generate a panoramic image. The direction determination section determines whether the camera moving direction is a first camera moving direction or a second camera moving direction that differs from the first camera moving direction when the imaging section is moved during capture. The panoramic image generation section performs the synthesis process of a still image among the (Continued)

consecutively acquired still images based on the camera moving direction when the consecutively acquired still images were captured to generate the panoramic image.

16 Claims, 10 Drawing Sheets

(58) Field of Classification Search
USPC .......................................................... 348/36
See application file for complete search history.

(56) References Cited

U.S. PATENT DOCUMENTS

| | | | | |
|---|---|---|---|---|
| 2011/0234832 A1* | 9/2011 | Ezoe | ...................... | H04N 5/232 |
| | | | | 348/222.1 |
| 2011/0298888 A1* | 12/2011 | Shimada | ................ | G03B 37/00 |
| | | | | 348/37 |

FOREIGN PATENT DOCUMENTS

| | | |
|---|---|---|
| JP | 2009-060278 A | 3/2009 |
| JP | 2009-124340 A | 6/2009 |
| WO | WO 2008/087721 A1 | 7/2008 |
| WO | WO 2013/015148 A1 | 1/2013 |

* cited by examiner

IMAGE PROCESSING SYSTEM, INFORMATION PROCESSING DEVICE, INFORMATION STORAGE DEVICE, AND IMAGE PROCESSING METHOD

CROSS REFERENCE TO RELATED APPLICATION

This application is a continuation of International Patent Application No. PCT/JP2012/068054, having an international filing date of Jul. 17, 2012, which designated the United States, the entirety of which is incorporated herein by reference. Japanese Patent Application No. 2011-164063 filed on Jul. 27, 2011 is also incorporated herein by reference in its entirety.

BACKGROUND

The present invention relates to an image processing system, an information processing device, an information storage device, an image processing method, and the like.

A technique that generates a panoramic image using a digital camera has been developed in recent years. A panoramic image is normally generated by stitching a plurality of still images captured while moving an imaging section in one direction.

The smoothness of the object within the panoramic image varies depending on the still image (material) capture position and the like. A technique that presents the camera moving direction/position or the like to the user who desires to generate a panoramic image has been proposed. For example, JP-A-11-352568, JP-A-2009-060278, and JP-A-2009-124340 disclose such a technique.

JP-A-11-352568 discloses a technique that provides guidance when the user captures still images used to generate a panoramic image by displaying the preceding captured still image on the end of a liquid crystal viewfinder as a reference live-view image.

JP-A-2009-060278 discloses a technique that provides guidance by displaying a guide mark that indicates a capture position at which the user is advised to capture the next still image used to generate a panoramic image.

JP-A-2009-124340 discloses a technique that calculates the degree of correlation between images based on feature points within the overlapping area (matching area) between the captured still image and the viewfinder image (live-view image), and provides capture timing guidance based on the degree of correlation between the images.

According to the guidance techniques disclosed in JP-A-11-352568, JP-A-2009-060278, and JP-A-2009-124340, the user can capture an image while manually adjusting the tilt and the position of the camera referring to the guidance information to generate a smooth panoramic image.

SUMMARY

According to one aspect of the invention, there is provided an image processing system comprising:

an image acquisition section that consecutively acquires still images;

a direction determination section that determines a camera moving direction, the camera moving direction being a moving direction of an imaging section during capture; and a panoramic image generation section that performs a synthesis process of the consecutively acquired still images to generate a panoramic image, the direction determination section determining whether the camera moving direction is a first camera moving direction or a second camera moving direction that differs from the first camera moving direction when the imaging section is moved during capture, and the panoramic image generation section determining a synthesis position of a still image among the consecutively acquired still images based on the camera moving direction when the consecutively acquired still images were captured, and performing the synthesis process of the still image to generate the panoramic image.

According to another aspect of the invention, there is provided an information processing device comprising:

a direction determination section that determines a camera moving direction, the camera moving direction being a moving direction of an imaging section during capture;

a panoramic image generation section that performs a synthesis process of still images that have been consecutively acquired by an image acquisition section to generate a panoramic image; and a storage section that stores the consecutively acquired still images and the generated panoramic image, the panoramic image generation section acquiring the consecutively acquired still images from the image acquisition section when the imaging section was moved in a first camera moving direction, and then moved in a second camera moving direction that differs from the first camera moving direction during capture, determining a synthesis position of a still image among the consecutively acquired still images based on the camera moving direction when the still image was captured, and performing the synthesis process of the still image to generate the panoramic image.

According to another aspect of the invention, there is provided a computer-readable storage device with an executable program stored thereon, wherein the program instructs a computer to perform steps of:

determining a camera moving direction, the camera moving direction being a moving direction of an imaging section during capture;

performing a synthesis process of consecutively acquired still images to generate a panoramic image;

acquiring the consecutively acquired still images when the imaging section was moved in a first camera moving direction, and then moved in a second camera moving direction that differs from the first camera moving direction during capture;

determining a synthesis position of a still image among the consecutively acquired still images based on the camera moving direction when the still image was captured; and performing the synthesis process of the still image to generate the panoramic image.

According to another aspect of the invention, there is provided an image processing method comprising:

consecutively acquiring still images;

determining a camera moving direction, the camera moving direction being a moving direction of an imaging section during capture;

performing a synthesis process of the consecutively acquired still images to generate a panoramic image;

determining whether the camera moving direction is a first camera moving direction or a second camera moving direction that differs from the first camera moving direction when the imaging section is moved during capture; and determining a synthesis position of a still image among the consecutively acquired still images based on the camera moving direction when the consecutively acquired still images were captured, and performing the synthesis process of the still image to generate the panoramic image.

DESCRIPTION OF EXEMPLARY EMBODIMENTS

Figure 1:
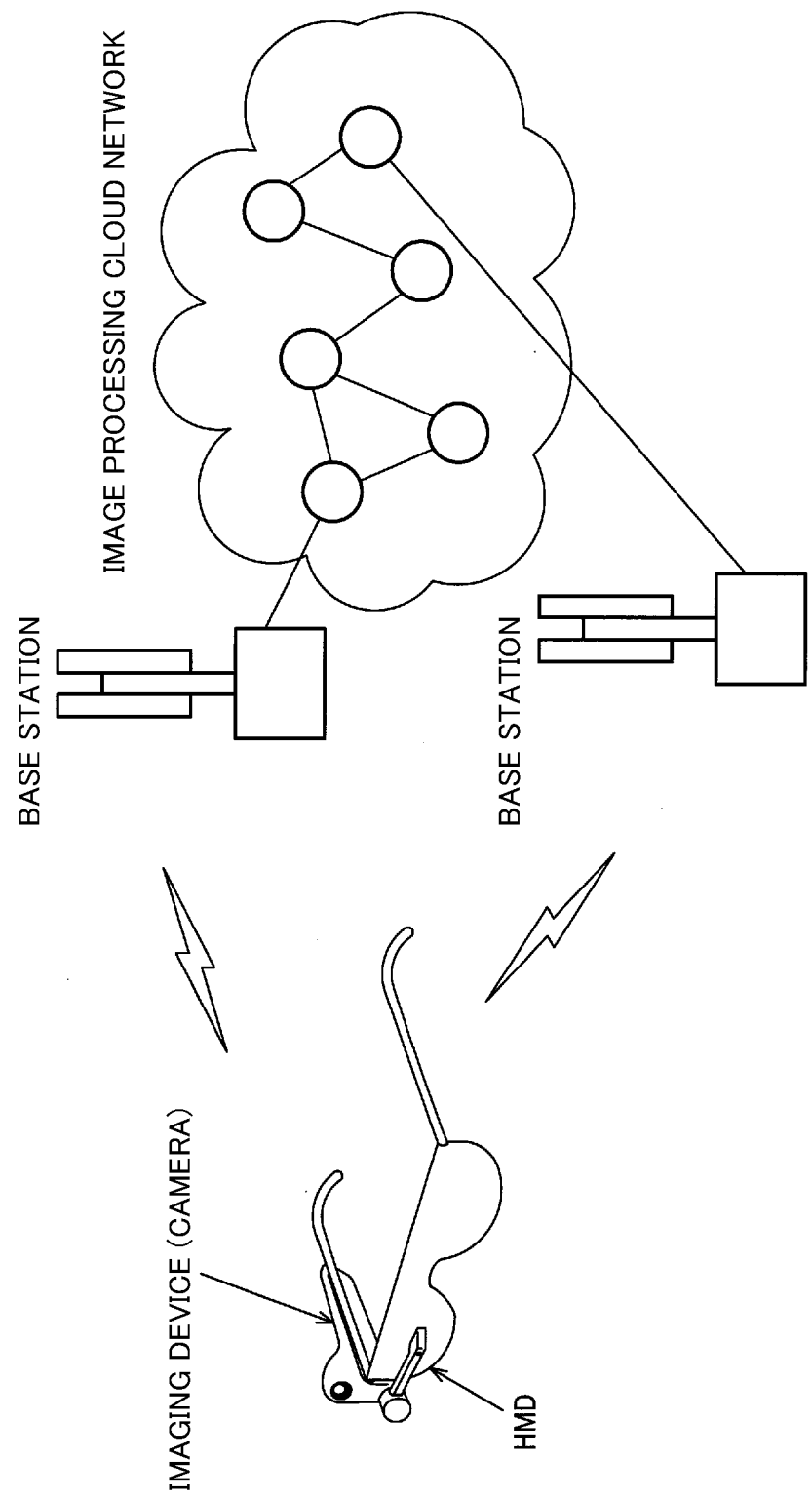
FIG. 1 illustrates a system configuration example according to one embodiment of the invention.

JP-A-11-352568, JP-A-2009-060278, and JP-A-2009-124340 disclose a technique that generates a panoramic image by moving the imaging section in one direction, but do not disclose a technique that generates a panoramic image by moving the imaging section in a plurality of directions, and a guidance method when moving the imaging section in a plurality of directions.

Several embodiments of the invention may provide an image processing system, an information processing device, an information storage device, an image processing method, and the like that can generate a panoramic image when the imaging section is moved in a plurality of directions during capture.

Several embodiments of the invention may provide an image processing system, an information processing device, an information storage device, an image processing method, and the like that can present the moving direction of the imaging section to the user, and generate a panoramic image when the imaging section is moved in a plurality of directions during capture.

According to one embodiment of the invention, still images used to generate the panoramic image can be consecutively acquired when the imaging section is moved in a plurality of camera moving directions during capture. Moreover, the current camera moving direction can be determined, and the synthesis position of the still image can be determined based on the camera moving direction. Therefore, it is possible to generate a panoramic image of which the angle of view is wider in a plurality of directions than that of a panoramic image generated by moving the imaging section in one camera moving direction.

In the image processing system, the panoramic image generation section may perform the synthesis process of the still image so that the still image has an overlapping area with a still image among the consecutively acquired still images that was used for a preceding synthesis process in the camera motion direction when the still image used for the preceding synthesis process was captured to generate the panoramic image.

The above configuration makes it possible to perform the synthesis process while making the consecutively acquired still images overlap in the camera moving direction.

In the image processing system, the direction determination section may determine a camera motion direction based on motion information about the imaging section acquired by a motion information acquisition section, the camera motion direction being a direction in which the imaging section is moved between still image capture timings, and the panoramic image generation section may determine the synthesis position of the still image based on the camera motion direction, and may perform the synthesis process of the still image to generate the panoramic image.

According to the above configuration, the camera motion direction can be determined, and the synthesis position of the still image can be determined based on the camera motion direction. Moreover, a position that conforms to the actual motion of the imaging section can be determined to be the synthesis position as compared with the case where the synthesis position is determined based on the camera moving direction.

In the image processing system, the panoramic image generation section may perform the synthesis process of the still image so that the still image has an overlapping area with a still image among the consecutively acquired still images that was used for a preceding synthesis process in the camera motion direction when the still image used for the preceding synthesis process was captured to generate the panoramic image.

The above configuration makes it possible to perform the synthesis process while making the consecutively acquired still images overlap in the camera motion direction.

In the image processing system, the direction determination section may determine whether the camera moving direction is the first camera moving direction, the second camera moving direction, or a third camera moving direction that differs from the first camera moving direction and the second camera moving direction when the imaging section is moved during capture.

The above configuration makes it possible to generate the panoramic image by moving the imaging section along a zigzag path.

The image processing system may further comprise:

a guidance information generation section that generates guidance information, the guidance information being information that indicates a moving direction of the imaging section to a user.

The above configuration makes it possible to present the guidance information to the user, for example.

In the image processing system, the guidance information generation section may generate shift guidance information as the guidance information when the direction determination section has determined that the camera moving direction is the third camera moving direction, the shift guidance information being information that prompts the user to move the imaging section in the second camera moving direction.

The above configuration makes it possible to provide guidance that prompts the user to change the camera moving direction to the second camera moving direction so that the still image captured when moving the imaging section in the first camera moving direction and the still image captured when moving the imaging section in the second camera moving direction have an overlapping area.

In the image processing system, the guidance information generation section may acquire a camera moving amount equivalent value of the imaging section in the third camera moving direction when the direction determination section has determined that the camera moving direction has changed from the first camera moving direction to the third camera moving direction, may determine whether or not the acquired camera moving amount equivalent value is equal to or larger than a given threshold value, and may generate the shift guidance information that prompts the user to move the imaging section in the second camera moving direction when it has been determined that the camera moving amount equivalent value is equal to or larger than the given threshold value.

The above configuration makes it possible to control the shift guidance information presentation timing using a given number of pixels of the captured image in the third camera moving direction, for example.

The image processing system may further comprise:

a storage section that stores camera motion direction information, the camera motion direction information being information that indicates a camera motion direction that is a direction in which the imaging section is moved between still image capture timings, the direction determination section may determine the camera motion direction based on motion information about the imaging section acquired by a motion information acquisition section, and the guidance information generation section, when the direction determination section has determined that the camera moving direction is the second camera moving direction, may read the camera motion direction information when the imaging section was moved in the first camera moving direction from the storage section in reverse order, and may generate path guidance information as the guidance information, the path guidance information being information that guides the user to move the imaging section in a direction opposite to the camera motion direction indicated by the camera motion direction information read from the storage section.

The above configuration makes it possible to prevent a situation in which the user erroneously moves the imaging section in the third camera moving direction when moving the imaging section in the second camera moving direction, and an overlapping area cannot be provided.

In the image processing system, the guidance information generation section may determine that the imaging section has reached a target position of the imaging section indicated by the generated path guidance information when it has been determined that the imaging section has been moved to be positioned within an error tolerance distance range that includes the target position based on the motion information, and may notify a presentation section of the path guidance information that indicates a next target position of the imaging section.

The above configuration makes it unnecessary for the user to accurately move the imaging section to the expected position, and makes it possible for the user to perform the capture operation while allowing an error, for example.

In the image processing system, the guidance information generation section may calculate difference information that indicates a difference between the target position of the imaging section indicated by the path guidance information and an actual position of the imaging section that has been moved, when the imaging section has been moved to be positioned within the error tolerance distance range, and may correct the path guidance information that indicates the next target position of the imaging section based on the difference information.

The above configuration makes it possible to provide the path guidance while canceling the accumulated error, and generate a panoramic image over the entire imaging range while providing an overlapping area, for example.

In the image processing system, the image acquisition section may calculate a motion vector based on motion information acquired by a motion information acquisition section, the motion vector being a vector that indicates a moving direction of the imaging section, and the image acquisition section may calculate a timing at which an absolute value of one of a horizontal component and a vertical component of the motion vector started to become larger than an absolute value of the other component to be a still image acquisition start timing used to generate the panoramic image when it has been determined that the absolute value of the one of the horizontal component and the vertical component of the motion vector is continuously larger than the absolute value of the other component for a given time.

The above configuration makes it possible for the user to start generating the panoramic image while wearing an HMD and looking around a scene without performing a manual operation or the like.

In the image processing system, the image acquisition section may calculate a motion vector based on motion information acquired by a motion information acquisition section, the motion vector being a vector that indicates a moving direction of the imaging section, and the image acquisition section may calculate a timing at which a magnitude of the motion vector started to become equal to or less than a given threshold value to be a still image acquisition stop timing used to generate the panoramic image when it has been determined that the magnitude of the motion vector is continuously equal to or less than the given threshold value for a given time.

The above configuration makes it possible for the user to stop generating the panoramic image while wearing an HMD and looking around a scene without performing a manual operation or the like.

In the image processing system, the image acquisition section may control a shutter release timing of the imaging section to consecutively acquire the still images.

The above configuration makes it possible to cause the number of still images captured by the imaging section to coincide with the number of still images acquired by the image acquisition section, and cause the image acquisition section to acquire the desired number of still images while preventing a situation in which the imaging section captures unnecessary still images, for example.

In the information processing device, the direction determination section may determine a camera motion direction based on motion information about the imaging section acquired by a motion information acquisition section, the camera motion direction being a direction in which the imaging section is moved between still image capture timings, the storage section may store camera motion direction information, the camera motion direction information being information that indicates the camera motion direction, and the panoramic image generation section may determine the synthesis position of the still image based on the camera motion direction, and may perform the synthesis process of the still image to generate the panoramic image.

In the information processing device, the panoramic image generation section may acquire the consecutively acquired still images from the image acquisition section when the imaging section was moved in the first camera moving direction, moved in a third camera moving direction that differs from the first camera moving direction and the second camera moving direction, and then moved in the second camera moving direction during capture, may determine the synthesis position of the still image, and may perform the synthesis process of the still image to generate the panoramic image.

The information processing device may further comprise:

a guidance information generation section that generates guidance information based on the camera moving direction, the guidance information being information that indicates a moving direction of the imaging section to a user.

In the information processing device, the guidance information generation section may generate shift guidance information as the guidance information when the direction determination section has determined that the camera moving direction is the third camera moving direction, the shift guidance information being information that prompts the user to move the imaging section in the second camera moving direction.

In the information processing device, the direction determination section may determine a camera motion direction based on motion information about the imaging section acquired by a motion information acquisition section, the camera motion direction being a direction in which the imaging section is moved between still image capture timings, the storage section may store camera motion direction information, the camera motion direction information being information that indicates the camera motion direction, and the guidance information generation section, when the direction determination section has determined that the camera moving direction is the second camera moving direction, may read the camera motion direction information when the imaging section was moved in the first camera moving direction from the storage section in reverse order, and may generate path guidance information as the guidance information, the path guidance information being information that guides the user to move the imaging section in a direction opposite to the camera motion direction indicated by the camera motion direction information read from the storage section.

Exemplary embodiments of the invention are described below. An outline and a system configuration example will be described first. A specific embodiment and a method will then be described. The flow of a process will then be described using a flowchart. Note that the following exemplary embodiments do not in any way limit the scope of the invention laid out in the claims. Note also that all of the elements described below in connection with the following exemplary embodiments should not necessarily be taken as essential elements of the invention.

1. Outline

A technique that generates a panoramic image using a digital camera has been developed in recent years. A panoramic image is normally generated by stitching a plurality of still images captured while moving an imaging section in one direction.

However, a technique that generates a panoramic image by moving the imaging section in one direction has a problem in that the angle of view of the panoramic image can be adjusted only in the moving direction of the imaging section. For example, the angle of view of the panoramic image cannot be increased in the direction perpendicular to the moving direction of the imaging section.

If still images captured while moving the imaging section in a plurality of directions are provided by moving the imaging section in a plurality of directions during capture, it is possible to generate a panoramic image of which the angle of view is increased in a plurality of directions.

According to several embodiments of the invention, when the imaging section is moved in a plurality of camera moving directions during capture, still images used to generate a panoramic image are consecutively acquired, and a panoramic image is generated based on the acquired still images.

The smoothness of the object within the panoramic image varies depending on the still image (material) capture position and the like. A technique that presents the camera moving direction/position or the like to the user who desires to generate a panoramic image has been proposed. For example, JP-A-11-352568, JP-A-2009-060278, and JP-A-2009-124340 disclose such a technique.

JP-A-11-352568 discloses a technique that provides guidance when the user captures still images used to generate a panoramic image by displaying the preceding captured still image on the end of a liquid crystal viewfinder as a reference live-view image.

JP-A-2009-060278 discloses a technique that provides guidance by displaying a guide mark that indicates a capture position at which the user is advised to capture the next still image used to generate a panoramic image.

JP-A-2009-124340 discloses a technique that calculates the degree of correlation between images based on feature points within the overlapping area (matching area) between the captured still image and the viewfinder image (live-view image), and provides capture timing guidance based on the degree of correlation between the images.

According to the guidance techniques disclosed in JP-A-11-352568, JP-A-2009-060278, and JP-A-2009-124340, the user can capture an image while manually adjusting the tilt and the position of the camera referring to the guidance information to generate a smooth panoramic image.

JP-A-2009-124340 also discloses a technique that implements automatic capture when the degree of correlation between the images is equal to or larger than a predetermined value, or excludes a face or a moving object from the matching area when a face or a moving object has been detected in order to prevent failure during synthesis.

JP-A-11-352568, JP-A-2009-060278, and JP-A-2009-124340 disclose a technique that generates a panoramic image by moving the imaging section in one direction, but do not disclose a technique that generates a panoramic image by moving the imaging section in a plurality of directions, and a guidance method when moving the imaging section in a plurality of directions.

According to several embodiments of the invention, the moving direction of the imaging section is presented to the user in order to generate a panoramic image when the imaging section is moved in a plurality of directions during capture.

2. System Configuration Example

FIG. 1 illustrates a configuration example of an image processing system according to one embodiment of the invention. In one embodiment of the invention, the image processing system is a server on an image processing cloud network. The image processing system may include a head mounted display (HMD), an imaging device (camera), and the like in addition to the image processing cloud network. The image processing system may be an information processing device included in an HMD or the like.

In one embodiment of the invention, the user captures the object using an imaging device included in an HMD while shaking his/her head to generate still images (or a movie), which are transmitted to the server on the image processing cloud network through a base station via wireless communication. The server then generates a panoramic image, and the user views the panoramic image on the HMD.

Note that the embodiments of the invention are for illustrative purposes only, and the image processing system is not limited to the configuration illustrated in FIG. 1. For example, various modifications may be made, such as omitting some of the elements illustrated in FIG. 1, or adding other elements. Note that the still image or the like need not necessarily be transmitted to the image processing system via wireless communication, but may be transmitted to the image processing system via cable communication. When the information processing system is an information processing device that is included in the HMD, the information processing system need not necessarily receive the still image or the like through a network, but may acquire the still image or the like through an internal bus or the like. The imaging device need not necessarily be integrated with the HMD, but may be a handheld camera or the like. The output device (e.g., HMD) need not necessarily be provided.

Figure 2:
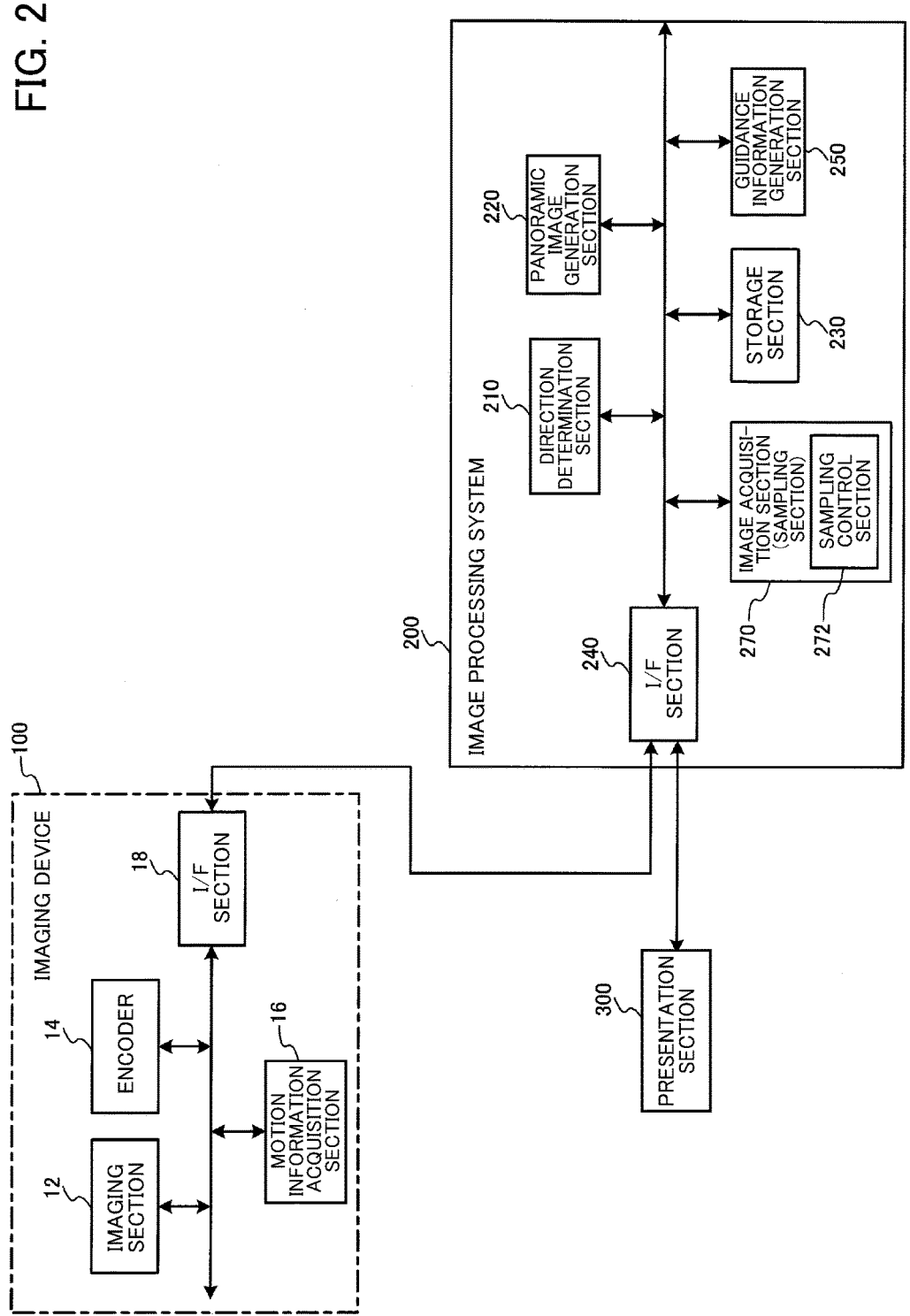
FIG. 2 illustrates a detailed system configuration example according to one embodiment of the invention.

FIG. 2 illustrates a detailed configuration example of the image processing system according to one embodiment of the invention. An image processing system 200 includes a direction determination section 210, a panoramic image generation section 220, a storage section 230, an I/F section 240, a guidance information generation section 250, and an image acquisition section (sampling section) 270. Note that the image processing system 200 is not limited to the configuration illustrated in FIG. 2. Various modifications may be made, such as omitting some of the elements illustrated in FIG. 2, or adding other elements. For example, the image processing system 200 may be implemented by a plurality of information processing devices.

The image processing system 200 is connected to an imaging device 100 and a presentation section 300. Examples of the imaging device 100 include a camera included in an HMD and the like. Examples of the image processing system 200 include a server on an image processing cloud network and the like. Examples of the presentation section 300 include an HMD and the like.

The imaging device 100 includes an imaging section 12, an encoder 14, a motion information acquisition section 16, and an I/F section 18. Note that the imaging device 100 is not limited to the configuration illustrated in FIG. 2. Various modifications may be made, such as omitting some of the elements illustrated in FIG. 2, or adding other elements.

The connection relationship between the above sections is described below. In the imaging device 100, the imaging section 12, the encoder 14, the motion information acquisition section 16, and the I/F section 18 are connected through an internal bus. In the image processing system 200, the direction determination section 210, the panoramic image generation section 220, the storage section 230, the I/F section 240, the guidance information generation section 250, and the image acquisition section (sampling section) 270 are connected through an internal bus.

A process performed by each section of the imaging device 100 is described below.

The imaging section (camera) 12 captures the object. The imaging section 12 includes an image sensor (e.g., CCD) and an optical system. The imaging section 12 may include a device (processor) that is used for image processing and the like.

The encoder 14 encodes a movie captured by the imaging section 12 using a video codec (e.g., MPEG codec). The function of the encoder 14 may be implemented by hardware such as a processor (e.g., CPU) or an ASIC (e.g., gate array), a program, or the like.

The motion information acquisition section 16 acquires motion information about the imaging section 12. The motion information acquisition section 16 may be a sensor such as an orientation sensor (e.g., terrestrial magnetism sensor), an acceleration sensor, or a gyro sensor. The motion information acquisition section 16 may acquire sensor information obtained by the sensor as the motion information about the imaging section 12. The orientation sensor is a terrestrial magnetism sensor or the like, and measures the orientation (angle (0 to 360°)) of the sensor. The terrestrial magnetism sensor includes a device that changes in resistance value or impedance value depending on the strength of a magnetic field, for example. The terrestrial magnetism sensor detects triaxial terrestrial magnetism information. The acceleration sensor includes a device that changes in resistance value depending on the external force, for example. The acceleration sensor detects triaxial acceleration information. The gyro sensor detects triaxial angular velocity information. A sensor that functions as the terrestrial magnetism sensor, the acceleration sensor, and/or the gyro sensor may also be used. The motion information acquisition section 16 may use position information obtained by a GPS as the motion information about the imaging section 12.

The motion information acquisition section 16 may acquire the amount of change in the imaging range or the like that can be specified from an internal camera parameter as the motion information about the imaging section 12. The motion information acquisition section 16 may acquire a motion vector as the motion information, the motion vector being obtained when the encoder 14 encodes the movie captured by the imaging section 12.

The I/F section 18 notifies the image processing system 200 of the information acquired from the imaging section 12, the encoder 14, and the motion information acquisition section 16.

A process performed by each section of the image processing system 200 is described below.

The direction determination section 210 determines the camera movement direction and the camera motion direction (described later).

The panoramic image generation section 220 generates a panoramic image based on the still images acquired from the image acquisition section (sampling section) 270 (described later).

The storage section 230 stores a database, and serves as a work area for the panoramic image generation section 220 and the like. The function of the storage section 230 may be implemented by a memory (e.g., RAM), a hard disk drive (HDD), or the like. The storage section 230 may store the still images acquired from the I/F section 240 or the image acquisition section (sampling section) 270 (described later), the panoramic image generated by the panoramic image generation section 220, and the like.

The I/F section 240 handles information communication between the image processing system 200 and the imaging device 100, and information communication between the image processing system 200 and the presentation section 300. Note that the I/F section 240 may communicate information via cable communication or wireless communication.

The guidance information generation section 250 generates guidance information based on the camera movement direction or the camera motion direction (described later).

The image acquisition section (sampling section) 270 acquires still images from the information acquired from the I/F section 240, and outputs a series of still images to each functional section. The image acquisition section (sampling section) 270 may include a sampling control section 272.

When the I/F section 240 has acquired information including a movie captured by the imaging device 100, the image acquisition section (sampling section) 270 samples still images from the captured movie at a sampling rate set by the sampling control section 272, and outputs a series of still images to each functional section.

When the I/F section 240 has acquired information including a series of still images, the image acquisition section 270 acquires the series of still images, and outputs the series of still images to each functional section. The series of still images may have been generated by an arbitrary method. For example, the imaging device 100 may have consecutively captured (generated) the series of still images, or the imaging device 100 may have captured a movie, and sampled (generated) the series of still images from the movie.

The sampling control section 272 sets the sampling rate. When the imaging device 100 consecutively captures still images, the sampling control section 272 may output the sampling rate and the like to the I/F section 18 of the imaging device 100 so that the sampling rate set by the sampling control section 272 can be used as the shutter speed or the capture interval.

The functions of the direction determination section 210, the panoramic image generation section 220, the guidance information generation section 250, and the image acquisition section (sampling section) 270 may be implemented by hardware such as a processor (e.g., CPU) or an ASIC (e.g., gate array), a program, or the like.

The presentation section 300 presents the panoramic image or the like acquired from the I/F section 240 of the image processing system 200 to the user. The presentation section 300 may include a sound output section and/or a vibration section in addition to the display section.

Figure 11:
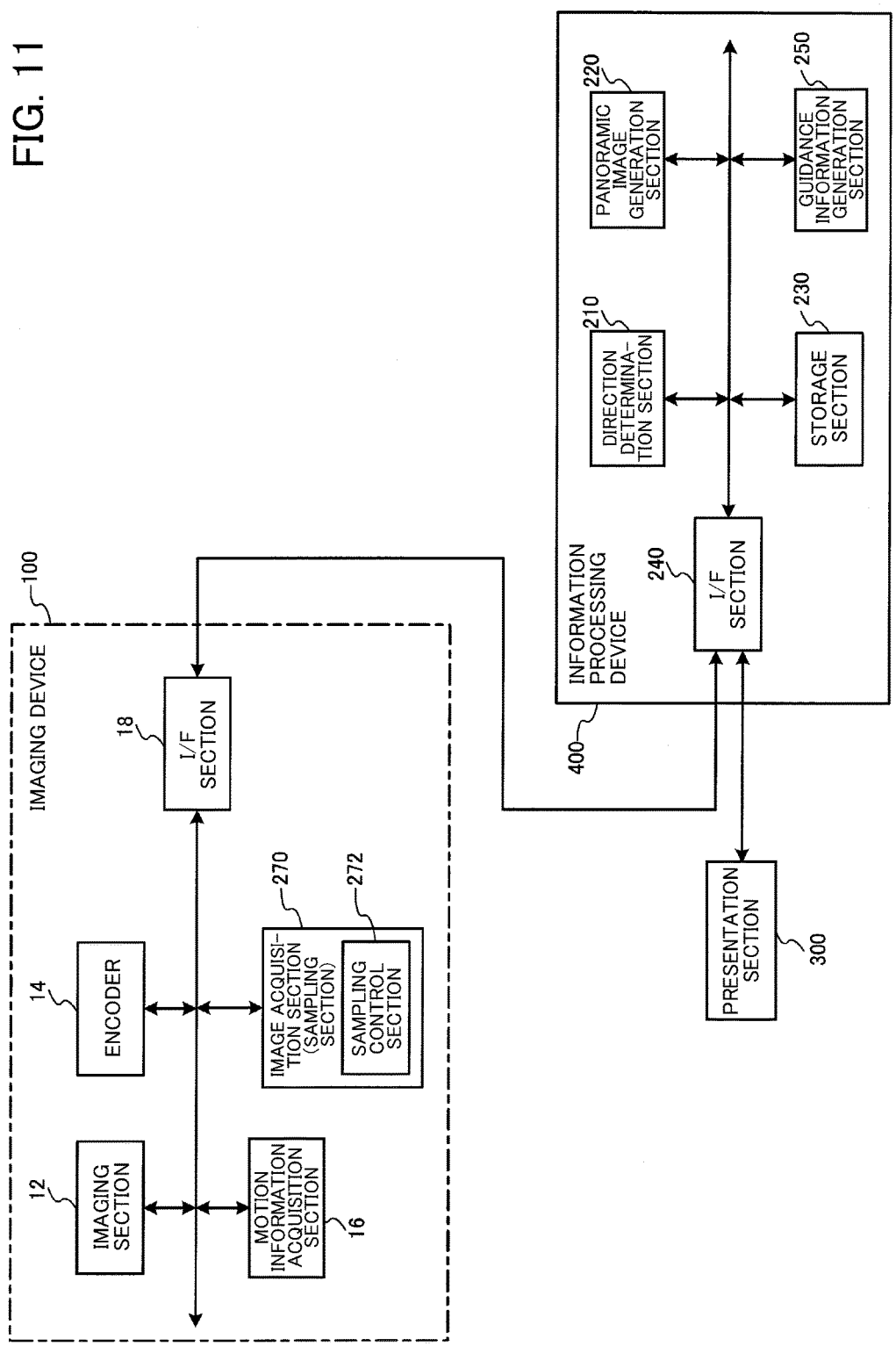
FIG. 11 illustrates another system configuration example according to one embodiment of the invention.

When the imaging device 100 is a smart camera or the like that has an image processing function, the configuration illustrated in FIG. 11 may be employed.

As illustrated in FIG. 11, the imaging device 100 may include the imaging section 12, the encoder 14, the motion information acquisition section 16, the I/F section 18, and the image acquisition section (sampling section) 270. An information processing device 400 may include the direction determination section 210, the panoramic image generation section 220, the storage section 230, the I/F section 240, and the guidance information generation section 250. Note that the imaging device 100 and the information processing device 400 are not limited to the configuration illustrated in FIG. 11. Various modifications may be made, such as omitting some of the elements illustrated in FIG. 11, or adding other elements.

The function of each section included in the imaging device 100 and the information processing device 400 is the same as described above.

According to the configuration illustrated in FIG. 11, since it suffices for the imaging device 100 to transmit only still images sampled from a movie to the information processing device 400 even when the imaging device 100 captures a movie, the data transfer amount can be reduced.

3. Specific Embodiment

A specific embodiment in which the panoramic image is generated from a movie is described below. Note that the panoramic image need not necessarily be generated from a movie. The panoramic image can also be generated in the same manner as described below when generating the panoramic image from consecutively captured still images.

Figure 3:
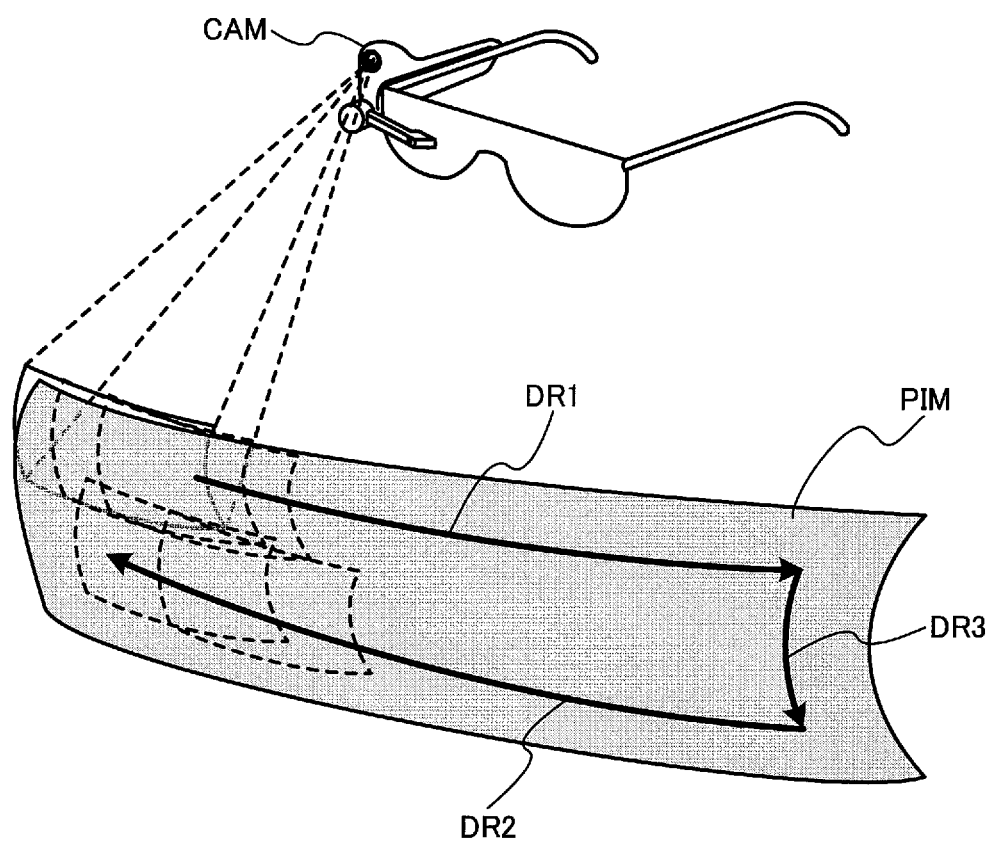
FIG. 3 is a view illustrating a technique that generates a panoramic image while moving an imaging section in a plurality of directions.

The object is captured within approximately the field-of-view range using a head mounted-type imaging section CAM illustrated in FIG. 3 to generate a movie.

A movie that reflects the motion of the user's head when the user looks around a scene can be easily captured by utilizing the head mounted-type imaging section CAM, and a realistic panoramic image can be generated.

In one embodiment of the invention, the user captures a movie while moving the imaging section CAM along a zigzag path, and a two-dimensional panoramic image PIM is generated from the movie. In FIG. 3, the object is captured while moving the imaging section CAM in a first camera moving direction DR1 (described later), moving the imaging section CAM in a third camera moving direction DR3 (described later), and then moving the imaging section CAM in a second camera moving direction DR2 (described later). After moving the imaging section CAM in the second camera moving direction DR2, the object may be captured while moving the imaging section CAM in another camera moving direction.

Note that the process that extracts (samples) still images used for synthesis of the panoramic image, and the panoramic image generation process may be performed by the imaging device, or may be performed by an image processing system (e.g., computer) that is connected to the imaging device through a communication section via a cable or wireless network.

Figure 4:
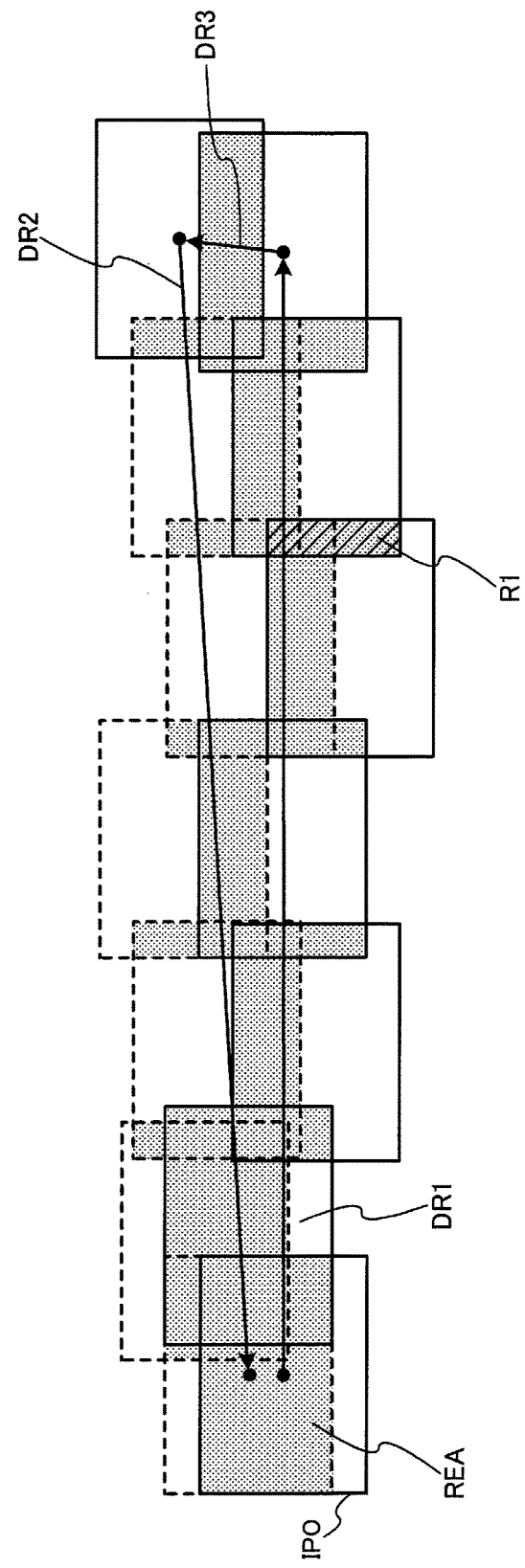
FIG. 4 is a view illustrating a camera moving direction and an overlapping area.

The panoramic image generation process performed when generating the panoramic image by capturing the object while moving the imaging section is described below with reference to FIG. 4. A frame at a still image acquisition start timing (hereinafter may be referred to as "acquisition start timing") is specified from the movie captured by the imaging section, and sampled as a still image. In FIG. 4, the still image corresponding to the acquisition start timing is set to be the initial position IPO. Still images are sampled from the movie at a given sampling rate, and synthesized so that the still images captured while moving the imaging section in the first camera moving direction and the still images captured while moving the imaging section in the second camera moving direction have an overlapping area REA to generate a panoramic image. The overlapping area REA is an area in which the pixels within an identical range of the object are included within a given distance range when overlapping two still images. Specifically, the still images are synthesized so that two still images overlap each other within an identical image area to form a single continuous still image. In this case, the still images are synthesized so that the currently captured still image and the preceding still image (i.e., adjacent still images) overlap each other within an identical image area. For example, the still images are synthesized so that the currently captured still image and the preceding still image overlap each other within an area R1.

It is necessary for the captured still images to have an overlapping area in order to generate a panoramic image using the above method. However, the captured still images may not have an overlapping area depending on the moving direction of the imaging section or the like.

In order to deal with the above problem, the guidance information is presented to the user so that the user moves the imaging section such that the captured still images have an overlapping area.

A method that generates a panoramic image by utilizing the camera motion direction is described below with reference to FIG. 5. The term "camera motion direction" used herein refers to the direction in which the imaging section has been moved during sampling.

The camera motion directions are calculated when the imaging section is moved in the first camera moving direction. Specifically, the camera motion directions $m_1$ to $m_6$ illustrated in FIG. 5 are calculated. Likewise, the camera motion directions are calculated when the imaging section is moved in the third camera moving direction. Specifically, the camera motion directions $V_1$ to $V_2$ illustrated in FIG. 5 are calculated.

The still images captured while moving the imaging section in the first camera moving direction and the still images captured while moving the imaging section in the second camera moving direction may not have an overlapping area if the imaging section is moved to a large extent in the third camera moving direction. Therefore, it is necessary to provide a shift guidance for changing the camera moving direction from the third camera moving direction to the second camera moving direction. In FIG. 5, the camera moving direction is changed from the third camera moving direction to the second camera moving direction so that the overlapping area has a width REW.

The user may erroneously move the imaging section in the third camera moving direction even when the shift guidance is provided so that the user changes the camera moving direction to the second camera moving direction. In this case, the still images captured while moving the imaging section in the first camera moving direction and the still images captured while moving the imaging section in the second camera moving direction may not have an overlapping area.

Figure 5:
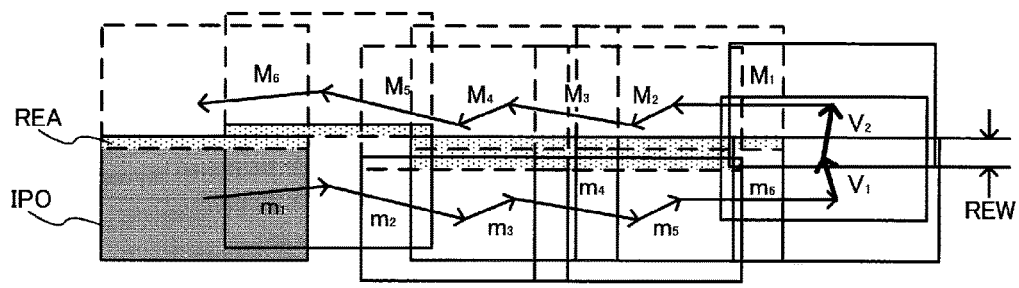
FIG. 5 is a view illustrating a camera motion direction and an overlapping area.

The overlapping area REA illustrated in FIG. 5 can be reliably obtained by reading the camera motion directions calculated when the imaging section is moved in the first camera moving direction in reverse order, and guiding the user to move the imaging section in the opposite camera motion directions ($M_1$ to $M_6$ in FIG. 5, $M_{7-i}$ is the direction opposite to the direction $m_i$ (i is an integer that satisfies $1 \le i \le 6$)) when the user moves the imaging section in the second camera moving direction. Note that the above guidance is referred to as "path guidance".

The camera motion direction may be obtained from a motion vector calculated when encoding a movie captured by the imaging section, sensor information acquired from an acceleration sensor, a gyro sensor, or the like, or information about the imaging range obtained from an internal camera parameter. It is advantageous to use a motion vector calculated when encoding a movie captured by the imaging section as the camera motion direction since it is unnecessary to provide a sensor, and the imaging device and the information processing device can be reduced in size.

Figure 6A:
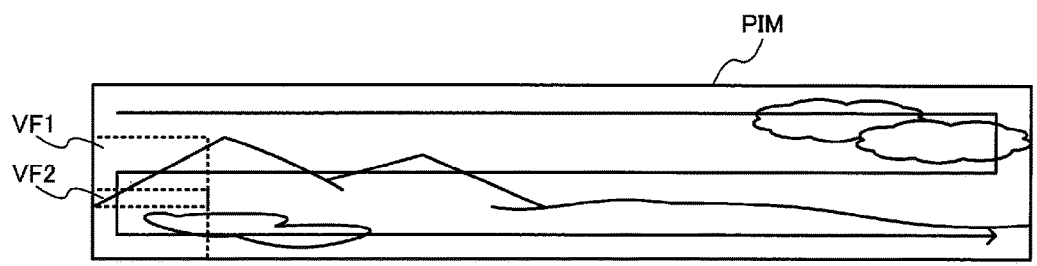
FIGS. 6A to 6C are views illustrating shift guidance.
Figure 6B:
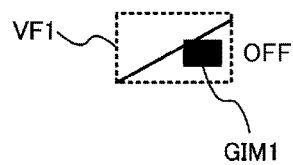
Figure 6C:
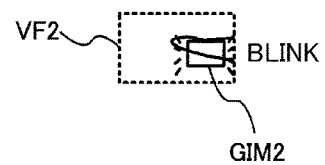

The details of the shift guidance are described below with reference to FIGS. 6A to 6C. FIG. 6A illustrates a state in which the imaging section is moved to the capture position corresponding to a frame VF2 when a frame VF1 has been captured, and the shift guidance is provided when the frame VF2 is captured. FIG. 6B illustrates the state of the presentation section of the HMD when the frame VF1 is captured. In FIG. 6B, an icon GIM1 that indicates the shift guidance is turned off. FIG. 6C illustrates the state of the presentation section of the HMD when the frame VF2 is captured. In FIG. 6C, an icon GIM2 that indicates the shift guidance is turned on to prompt the user to change the camera moving direction.

Whether or not to present the shift guidance may be determined by the following method, for example. Specifically, when it has been detected that the object has been captured while moving the imaging section in the first camera moving direction, and the imaging section has been moved in the third camera moving direction for a given time based on the camera motion direction, the moving amount of the imaging section after the camera moving direction has been changed to the third camera moving direction is calculated. Next, the moving amount of the pixels corresponding to an identical image range before and after the imaging section is moved, when the imaging section is moved by the calculated moving amount, is calculated. When the moving amount of the pixels exceeds a given percentage (e.g., 80%) of the dimension of the frame VF1 in the third camera moving direction, it is determined to present the shift guidance that prompts the user to change the camera moving direction to the second camera moving direction. In this case, the still images captured while moving the imaging section in the first camera moving direction and the still images captured while moving the imaging section in the second camera moving direction can be overlapped by about 20% to generate a panoramic image.

It is desirable to present guidance information that allows the user to easily perceive that the guidance information has been presented even if the user is not carefully observing the guidance information (e.g., an arrow, a color figure, a blinking figure, the vibration pattern of a vibrator, or sound that utilizes a bone conduction speaker or the like).

When using a mobile information presentation terminal (e.g., HMD) that is provided with a see-through display section and designed so that information can be displayed within the field of view, the user can check the guidance information during shooting if an arrow, a color figure, a blinking figure, or the like is displayed instead of detailed text information. It is also possible to use guidance information that need not be observed (e.g., the vibration pattern of a vibrator). Note that it is desirable to provide a vibrator separately from the imaging section since the image may be vibrated when a vibrator is integrated with the imaging section. For example, an earphone-type vibrator may be used, or a vibrator may be provided on the side opposite to the imaging section. It is possible to provide audio guidance by utilizing a bone conduction speaker.

According to the above configuration, the user can check the guidance information without being disturbed by the guidance, and concentrate on shooting. Moreover, an image processing system that exhibits excellent portability, and allows the user to reliably capture a still image (material) can be provided by integrating the guidance information presentation section with the imaging section.

The details of the path guidance are described below with reference to FIG. 7.

Figure 7:
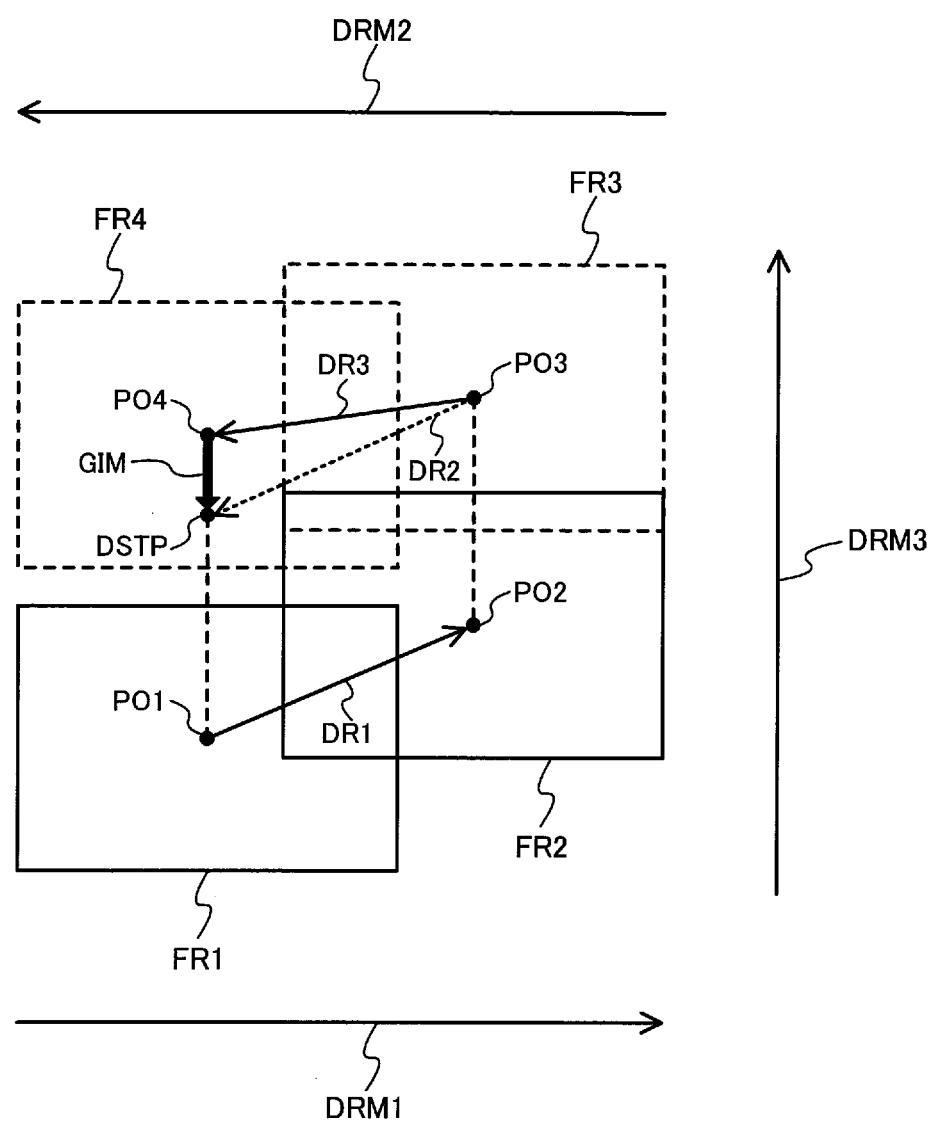
FIG. 7 is a view illustrating path guidance.

For example, the user captures the object while moving the imaging section in the first camera moving direction DRM1, and the still images FR1 and FR2 illustrated FIG. 7 are sampled. Note that PO1 is the center point of the still image FR1, and PO2 is the center point of the still image FR2.

In this case, the camera motion direction DR1 between the adjacent still images FR1 and FR2 is calculated. Note that the camera motion direction DR1 corresponds to the vector from the center point PO1 to the center point PO2.

The user then moves the imaging section in the third camera moving direction DRM3, and moves the imaging section in the second camera moving direction DRM2.

When the user moves the imaging section in the second camera moving direction DRM2, the path guidance is presented so that the user moves the imaging section (camera) in the direction DR2 that is opposite to the camera motion direction DR1 so that the sampled still images overlap each other. The guidance information used for the path guidance may be an arrow image similar to that used for the shift guidance.

However, there may be a case where the user cannot successfully move the imaging section, or the position of the imaging section is shifted due to shake even when the path guidance is presented to the user. FIG. 7 illustrates an example in which the imaging section has been moved in a camera motion direction DR3. In the example illustrated in FIG. 7, still images FR3 and FR4 are sampled from the movie captured while the imaging section was moved. Since the imaging section was moved in the direction differing from the camera motion direction DR2 indicated by the path guidance, the still images FR1 and FR4 do not have an overlapping area.

In this case, a vector GIM between the center position PO4 of the still image FR4 and the target position DSTP when the imaging section is moved from the center position PO3 of the still image FR3 in the camera motion direction DR2, may be calculated, and the path guidance may be presented to the user based on the vector GIM.

Figure 8:
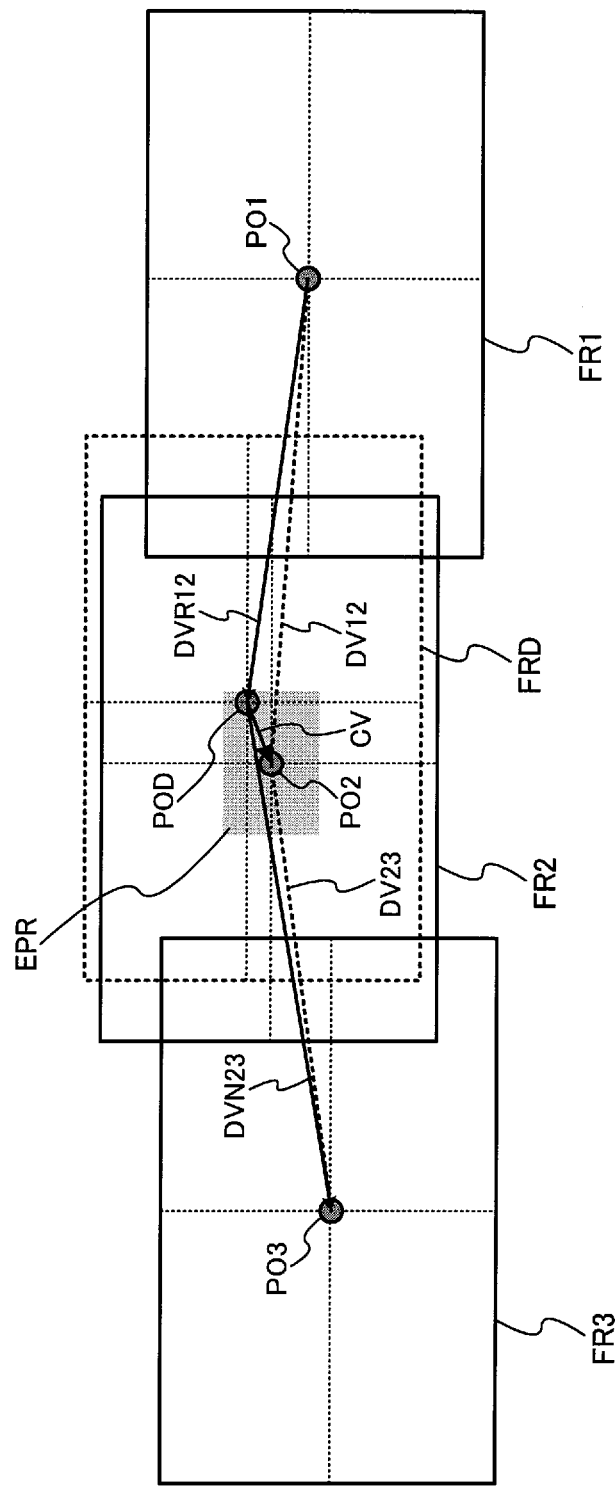
FIG. 8 is a view illustrating a method that corrects path guidance information based on difference information.

FIG. 8 illustrates an example in which the path guidance is presented to the user from the capture position of the still image FR1 so that the user moves the imaging section to capture a movie from which the still images FR2 and FR3 can be sampled. Specifically, the path guidance is presented to the user so that the vector between the center position PO1 of the still image FR1 and the center position PO2 of the still image FR2 is DV12, and the vector between the center position PO2 of the still image FR2 and the center position PO3 of the still image FR3 is DV23.

In the example illustrated in FIG. 8, the imaging section is erroneously moved from the center position PO1 along the path DVR12 so that the center position of the still image is POD. In FIG. 8, an error tolerance range EPR is provided taking account of the fact that it is difficult to accurately move the imaging section in accordance with the path guidance, and it is determined that the objective of the path guidance using the vector DV12 was achieved when the center position POD is included within the error tolerance range EPR. In this case, a still image FRD having the center position POD is used as an alternative to the still image FR2 although it is desirable to sample the still image FR2. After calculating a vector CV from the center position POD to the center position PO2, a new vector DVN23 is calculated using the vector CV and the vector DV23, and the path guidance is presented to the user based on the vector DVN23.

A method that determines the still image acquisition start timing and the still image acquisition stop timing when synthesizing the panoramic image PIM is described below with reference to FIG. 9.

Specifically, it is determined that the user has started capturing a movie for generating the panoramic image when it has been detected that the imaging section has been moved in the same direction for a given time. Note that a movie may have been continuously captured before the acquisition start timing, and the frame may be marked with the acquisition start timing. Whether or not the imaging section has been moved in the same direction for a given time is determined by calculating a motion vector that indicates the moving direction of the imaging section, and determining whether or not the absolute value of one of the horizontal component and the vertical component of the motion vector is continuously larger than the absolute value of the other component for a given time.

Figure 9:
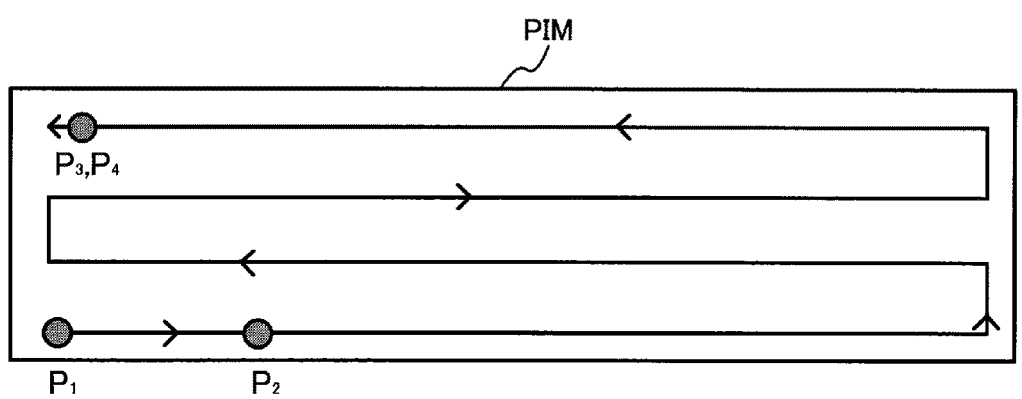
FIG. 9 is a view illustrating a still image acquisition start timing and a still image acquisition stop timing.

In FIG. 9, $P_1$ is the capture start frame, and $P_2$ is the frame at the capture start determination timing. It is determined that the user has started capturing a movie at the frame $P_2$ after it has been detected that the imaging section has been moved in the same direction for a given time. Since the user has started moving the imaging section in the same direction at the frame $P_1$, the frame $P_1$ is considered to be the frame at the capture start timing, and the movie is recorded from the frame $P_1$. The frames from the frame $P_1$ to the frame $P_2$ may be temporarily buffered, and stored as a movie file. Alternatively, the movie may be stored as a streaming movie over a given period, and the start frame may be marked with the acquisition start timing.

It is determined that the user has stopped capturing the movie when it has been detected that the imaging section has not been moved for a given time. In FIG. 9, $P_3$ is the capture stop frame, and $P_4$ is the frame at the capture stop determination timing. Since a plurality of similar unnecessary frames are captured from the frame $P_3$ to the frame $P_4$, it is desirable to store the movie file up to the frame $P_3$, or mark the frame $P_3$ with the acquisition stop timing. It may be determined that the user has stopped capturing the movie when it has been determined that the movie has been captured in the second camera moving direction over almost the same distance as that in the first camera moving direction. It is also possible to preset the number of times that the camera moving direction is changed.

The above configuration makes it possible to start and stop capturing a movie while looking around a scene without making an extra motion.

4. Method

According to the above embodiments, the image processing system includes the image acquisition section 270 that consecutively acquires still images, the direction determination section 210 that determines the camera moving direction that is the moving direction of the imaging section 12 during capture, and the panoramic image generation section 220 that performs a synthesis process of the consecutively acquired still images to generate a panoramic image. The direction determination section 210 determines whether the camera moving direction is the first camera moving direction or the second camera moving direction that differs from the first camera moving direction when the imaging section 12 is moved during capture. The panoramic image generation section 220 determines the synthesis position of a still image among the consecutively acquired still images based on the camera moving direction when the consecutively acquired still images were captured, and performs the synthesis process of the still image to generate the panoramic image.

According to the above configuration, when the imaging section is moved in a plurality of camera moving directions during capture, still images used to generate the panoramic image can be consecutively acquired, and the current camera moving direction can be determined The expression "consecutively acquires still images" used herein when the imaging section captures a still image means acquiring still images consecutively captured while consecutively moving the imaging section. The expression "consecutively acquires still images" used herein when the imaging section captures a movie means that the image acquisition section 270 samples and acquires still images from a movie captured while consecutively moving the imaging section, or means acquiring still images sampled by another functional section (e.g., imaging section) from a movie captured while consecutively moving the imaging section.

The term "camera moving direction" used herein refers to the direction of a vector that connects two arbitrary different points along a path that is drawn when moving the imaging section. For example, the camera moving direction refers to the direction DR1, DR2, or DR3 illustrated in FIG. 3. The camera moving direction may be set in advance. When one of the horizontal component and the vertical component of the motion vector indicated by the motion information about the imaging section acquired by the motion information acquisition section (described later) is continuously larger than the other component for a given period, the direction corresponding to the component that is larger than the other component may be determined to be the camera moving direction.

An arbitrary camera moving direction is referred to as the first camera moving direction, and an arbitrary camera moving direction that differs from the first camera moving direction is referred to as the second camera moving direction. Note that the camera moving direction is not limited to the first camera moving direction and the second camera moving direction. A camera moving direction other than the first camera moving direction and the second camera moving direction may also be used.

According to the above configuration, the synthesis position of the still image can be determined based on the camera moving direction, and the synthesis process can then be performed.

The term "synthesis process" used herein refers to a process that make an image acquired as a result of performing the synthesis process and a newly acquired still image stitch to generate a single image.

The term "synthesis position" used herein refers to the position of a still image relative to an image acquired as a result of performing the synthesis process.

Therefore, it is possible to generate a panoramic image of which the angle of view is wider in a plurality of directions than that of a panoramic image generated by moving the imaging section in one camera moving direction.

The panoramic image generation section 220 may perform the synthesis process of the still image so that the still image has an overlapping area with the still image used for the preceding synthesis process in the camera moving direction when the still image used for the preceding synthesis process was captured to generate the panoramic image.

The panoramic image generation section 220 may set the still image that was first acquired to be a reference position when performing the first synthesis process. The panoramic image generation section 220 may perform the synthesis process of the still image so that the still image has an overlapping area with the still image used for the preceding synthesis process in the first camera moving direction when it has been determined that the camera moving direction is the first camera moving direction. The panoramic image generation section 220 may perform the synthesis process of the still image so that the still image has an overlapping area with the still image used for the preceding synthesis process in the second camera moving direction when it has been determined that the camera moving direction is the second camera moving direction.

The term "overlapping area" used herein refers to an area in which two images are made to overlap by the synthesis process. For example, the overlapping area is the area R1 illustrated in FIG. 4.

As a modification, the direction determination section 210 may assign an ID that indicates the synthesis position to each still image based on the camera moving direction, and the panoramic image generation section 220 may synthesize the still images based on the assigned ID to generate the panoramic image.

This makes it possible to perform the synthesis process while making the consecutively acquired still images overlap in the camera moving direction.

The direction determination section 210 may determine the camera motion direction based on the motion information about the imaging section 12 acquired by the motion information acquisition section 16, the camera motion direction being a direction in which the imaging section 12 is moved between the still image capture timings, and the panoramic image generation section 220 may determine the synthesis position of the still image based on the camera motion direction, and perform the synthesis process of the still image to generate the panoramic image.

The term "motion information" used herein refers to sensor information or a motion vector acquired by the motion information acquisition section.

The term "still image capture timing" used herein when the imaging section 12 consecutively captures still images refers to the timing at which the still image acquired by the image acquisition section 270 was captured. The term "still image capture timing" used herein when the imaging section 12 captures a movie refers to the timing at which the frame of the captured movie that corresponds to the still image to be sampled was captured. Note that the still image capture timing may differ from the timing at which the image acquisition section 270 acquires the still image.

The term "camera motion direction" used herein refers to the direction in which the imaging section is moved between the still image capture timings. Note that information that indicates the camera motion direction is referred to as "camera motion direction information". For example, the camera motion direction is the direction indicated by the vector $m_1$ illustrated in FIG. 5.

According to the above configuration, the camera motion direction can be determined, and the synthesis position of the still image can be determined based on the camera motion direction, for example. Moreover, a position that conforms to the actual motion of the imaging section can be determined to be the synthesis position as compared with the case where the synthesis position is determined based on the camera moving direction, for example.

The panoramic image generation section 220 may perform the synthesis process of the still image so that the still image has an overlapping area with the still image used for the preceding synthesis process in the camera motion direction when the still image used for the preceding synthesis process was captured to generate the panoramic image.

This makes it possible to perform the synthesis process while making the consecutively acquired still images overlap in the camera motion direction.

The direction determination section 210 may determine whether the camera moving direction is the first camera moving direction, the second camera moving direction, or the third camera moving direction that differs from the first camera moving direction and the second camera moving direction when the imaging section 12 is moved during capture.

The third camera moving direction is a direction that differs from the first camera moving direction and the second camera moving direction. For example, the third camera moving direction is the direction DR3 illustrated in FIG. 4.

The above configuration makes it possible to generate the panoramic image when moving the imaging section along a zigzag path, for example. It is possible to generate a panoramic image over a range wider than the angle of view of the imaging section in a plurality of directions by moving the imaging section along a zigzag path during capture, for example. Moreover, since it is unnecessary to move the imaging section for positioning that adjusts the capture start position in the first camera moving direction and the capture start position in the second camera moving direction, it is possible to reduce the burden imposed on the user, for example. Since the materials for generating the panoramic image can be provided by capturing a movie once, it is possible to further reduce the burden imposed on the user, for example.

The image processing system may include the guidance information generation section 250 that generates the guidance information that is information indicating the moving direction of the imaging section 12 to the user.

The guidance information is information that indicates the moving direction of the imaging section to the user. The guidance information includes the shift guidance information and the path guidance information (described later).

The above configuration makes it possible to present the guidance information to the user, for example. This makes it possible for the user to move the imaging section so that the captured still images have an overlapping area (i.e., it is possible to prevent a situation in which the still images do not have an overlapping area), for example.

The guidance information generation section 250 may generate the shift guidance information as the guidance information when the direction determination section 210 has determined that the camera moving direction is the third camera moving direction, the shift guidance information being information that prompts the user to move the imaging section 12 in the second camera moving direction.

The shift guidance information is information that prompts the user to move the imaging section in the second camera moving direction when the direction determination section has determined that the camera moving direction is the third camera moving direction. For example, the shift guidance information is the information GIM2 illustrated in FIG. 6C.

The above configuration makes it possible to provide guidance that prompts the user to change the camera moving direction to the second camera moving direction so that the still image captured when moving the imaging section in the first camera moving direction and the still image captured when moving the imaging section in the second camera moving direction have an overlapping area.

The guidance information generation section 250 may acquire a camera moving amount equivalent value of the imaging section in the third camera moving direction when the direction determination section 210 has determined that the camera moving direction has changed from the first camera moving direction to the third camera moving direction, determine whether or not the acquired camera moving amount equivalent value is equal to or larger than a given threshold value, and generate the shift guidance information that prompts the user to move the imaging section in the second camera moving direction when it has been determined that the camera moving amount equivalent value is equal to or larger than the given threshold value.

The camera moving amount equivalent value is a value that indicates the moving amount of the imaging section. The camera moving amount equivalent value may or may not be the actual moving distance of the imaging section. For example, the camera moving amount equivalent value may be the number of pixels by which the pixels within an identical range of the object were moved within the captured image when comparing a plurality of captured images captured by the imaging section. The camera moving amount equivalent value may be the motion information acquired by the motion information acquisition section 16, the encoding information acquired by the encoder 14, or the like.

The guidance information generation section 250 may acquire the captured image captured by the imaging section 12 when the direction determination section 210 has determined that the camera moving direction has changed from the first camera moving direction to the third camera moving direction, determine whether or not the imaging section 12 has been moved by a given number of pixels of the captured image in the third camera moving direction after the camera moving direction has changed to the third camera moving direction, and generate the shift guidance information that prompts the user to move the imaging section 12 in the second camera moving direction when it has been determined that the imaging section 12 has been moved by the given number of pixels of the captured image in the third camera moving direction.

The term "captured image" used herein refers to an image captured by the imaging section. The still images consecutively acquired by the image acquisition section may be used as the captured image used to calculate the moving amount of the imaging section, or a frame at a timing differing from the panorama synthesis image capture timing may be acquired, and used as the captured image used to calculate the moving amount of the imaging section.

The above configuration makes it possible to control the shift guidance information presentation timing using a given number of pixels of the captured image in the third camera moving direction, for example.

The image processing system may include the storage section 230 that stores the camera motion direction information, the camera motion direction information being information that indicates the camera motion direction that is a direction in which the imaging section 12 is moved between the still image capture timings, the direction determination section 210 may determine the camera motion direction based on the motion information about the imaging section 12 acquired by the motion information acquisition section 16, and the guidance information generation section 250 may read the camera motion direction information when the imaging section 12 was moved in the first camera moving direction from the storage section 230 in reverse order when the direction determination section 210 has determined that the camera moving direction is the second camera moving direction, and generate the path guidance information as the guidance information, the path guidance information being information that guides the user to move the imaging section 12 in the direction opposite to the camera motion direction indicated by the camera motion direction information read from the storage section 230.

The path guidance information is information that indicates the moving direction of the imaging section to the user when the user moves the imaging section in the second camera moving direction. For example, the path guidance information is the information GIM illustrated in FIG. 7.

The above configuration makes it possible to prevent a situation in which the user erroneously moves the imaging section in the third camera moving direction when moving the imaging section in the second camera moving direction, and an overlapping area cannot be provided.

The guidance information generation section 250 may determine that the imaging section 12 has reached the target position of the imaging section 12 indicated by the generated path guidance information when it has been determined that the imaging section 12 has been moved to be positioned within an error tolerance distance range that includes the target position based on the motion information, and notify the presentation section 300 of the path guidance information that indicates the next target position of the imaging section 12.

The error tolerance distance range is a given distance range that is set based on a given error tolerance, and includes the target position of the imaging section. For example, the error tolerance distance range is the range EPR illustrated in FIG. 8.

The error tolerance refers to a degree by which a shift from the target position of the imaging section is allowed.

The target position refers to the position of the imaging section that is moved from the current position in the direction opposite to the direction of the vector indicated by the camera motion direction information acquired when the imaging section was moved in the first camera moving direction by the same distance as that when the imaging section was moved in the first camera moving direction. For example, the target position is the position PO2 or PO3 illustrated in FIG. 8.

The above configuration makes it unnecessary for the user to accurately move the imaging section to the expected position, and makes it possible for the user to perform the capture operation while allowing an error, for example.

The guidance information generation section 250 may calculate difference information that indicates the difference between the target position of the imaging section 12 indicated by the path guidance information and the actual position of the imaging section 12 that has been moved, when the imaging section 12 has been moved to be positioned within the error tolerance distance range, and correct the path guidance information that indicates the next target position of the imaging section 12 based on the difference information.

The difference information is information that indicates the difference between the target position and the actual position of the imaging section. For example, the difference information is the vector CV illustrated in FIG. 8.

The above configuration makes it possible to provide the path guidance while canceling the accumulated error, and generate a panoramic image over the entire imaging range while providing an overlapping area.

The image acquisition section 270 may calculate a motion vector based on the motion information acquired by the motion information acquisition section 16, the motion vector being a vector that indicates the moving direction of the imaging section 12, and calculate the timing at which the absolute value of one of the horizontal component and the vertical component of the motion vector started to become larger than the absolute value of the other component to be the still image acquisition start timing used to generate the panoramic image when it has been determined that the absolute value of one of the horizontal component and the vertical component of the motion vector is continuously larger than the absolute value of the other component for a given time.

The still image acquisition start timing refers to the timing (among the timings at which the still images are consecutively captured) at which the image acquisition section starts to acquire the still image used to generate the panoramic image when the imaging section consecutively captures the still images. Specifically, the imaging section consecutively captures still images from a timing before the still image acquisition start timing, the image acquisition section acquires the still images captured after the still image acquisition start timing, and the acquired still images are used to generate the panoramic image. In FIG. 9, the imaging section captures the still images from the timing (frame) $P_1$. It is determined that the imaging section is moved in an identical direction at the timing (frame) $P_2$, and the timing $P_1$ at which the imaging section started to be moved is calculated to be the still image acquisition start timing. In this case, a given number of still images that have been captured may be stored in the storage section 230 or the like, and the image acquisition section 270 may acquire the still images from the storage section 230.

The still image acquisition start timing refers to the start point of the period in which the still images are sampled for generating the panoramic image when the imaging section captures a movie. Note that the still image acquisition start timing may not be the timing at which the imaging section actually starts to capture a movie in the same manner as in the case where the imaging section consecutively captures still images.

The above configuration makes it possible for the user to start generating the panoramic image while wearing an HMD and looking around a scene without performing a manual operation or the like.

The image acquisition section 270 may calculate a motion vector based on the motion information acquired by the motion information acquisition section 16, the motion vector being a vector that indicates the moving direction of the imaging section 12, and calculate the timing at which the magnitude of the motion vector started to become equal to or less than a given threshold value to be the still image acquisition stop timing used to generate the panoramic image when it has been determined that the magnitude of the motion vector is continuously equal to or less than the given threshold value for a given time.

The still image acquisition stop timing refers to the timing (among the timings at which the still images are consecutively captured) at which the image acquisition section stops acquiring the still image used to generate the panoramic image when the imaging section consecutively captures the still images. Specifically, the imaging section may consecutively capture still images after the still image acquisition stop timing, the image acquisition section acquires the still images captured up to the still image acquisition stop timing, and the acquired still images are used to generate the panoramic image. In FIG. 9, the imaging section still captures a still image at the timing (frame) $P_4$. It is determined that the imaging section is not moved at the timing (frame) $P_4$, and the timing $P_3$ at which the imaging section is stopped is calculated to be the still image acquisition stop timing.

The still image acquisition stop timing refers to the end point of the period in which the still images are sampled for generating the panoramic image when the imaging section captures a movie. Note that the still image acquisition stop timing may not be the timing at which the imaging section actually stops capturing a movie in the same manner as in the case where the imaging section consecutively captures still images.

The above configuration makes it possible for the user to stop generating the panoramic image while wearing an HMD and looking around a scene without performing a manual operation or the like.

When the still image capture speed achieved by the imaging device 100 (or the still image sampling speed (from a movie) achieved by the imaging device 100 (hereinafter the same)) is higher than the still image acquisition speed achieved by the image acquisition section 270, some of the still images acquired by the imaging device 100 are wasted. When the still image capture speed achieved by the imaging device 100 is lower than the still image acquisition speed achieved by the image acquisition section 270, the image acquisition section 270 cannot acquire a sufficient number of images necessary for generating the panoramic image.

Therefore, the image acquisition section 270 may control the shutter release timing of the imaging section to consecutively acquire the still images.

The shutter release timing is controlled by outputting information about the sampling rate set by the sampling control section 272 or the like to the imaging device 100. Information about the shutter speed, the capture interval, or the like calculated based on the sampling rate may also be output to the imaging device 100.

The above configuration makes it possible to cause the number of still images captured by the imaging section to coincide with the number of still images acquired by the image acquisition section, and cause the image acquisition section to acquire the desired number of still images while preventing a situation in which the imaging section captures unnecessary still images, for example.

The image processing system, the information processing device, and the like according to the embodiments of the invention may be implemented by a program or a computer-readable information storage device that stores the program. In this case, the image processing system, the information processing device, and the like according to the embodiments of the invention are implemented by causing a processor (e.g., CPU) to execute the program. Specifically, the program stored in the information storage device is read from the information storage device, and the processor (e.g., CPU) executes the program read from the information storage device. The information storage device (computer-readable device) stores a program, data, and the like. The function of the information storage device may be implemented by an optical disk (e.g., DVD or CD), a hard disk drive (HDD), a memory (e.g., memory card or ROM), or the like. The processor (e.g., CPU) performs various processes according to the embodiments of the invention based on the program (data) stored in the information storage device. Specifically, a program that causes a computer (i.e., a device including an operation section, a processing section, a storage section, and an output section) to function as each section according to the embodiments of the invention (i.e., a program that causes a computer to execute the process implemented by each section) is stored in the information storage device.

The image processing system, the information processing device, and the like according to the embodiments of the invention may include a processor and a memory. The processor may be a central processing unit (CPU), for example. Note that the processor is not limited to a CPU. Various types of processors such as a graphics processing unit (GPU) and a digital signal processor (DSP) may also be used. The processor may be a hardware circuit that includes an application specific integrated circuit (ASIC). The memory stores a computer-readable instruction. Each section of the image processing system, the information processing device, and the like according to the embodiments of the invention is implemented by causing the processor to execute the instruction. The memory may be a semiconductor memory (e.g., static random access memory (SRAM) or dynamic random access memory (DRAM)), a register, a hard disk, or the like. The instruction may be an instruction included in an instruction set of a program, or may be an instruction that causes a hardware circuit of the processor to operate.

5. Flow of Process

Figure 10:
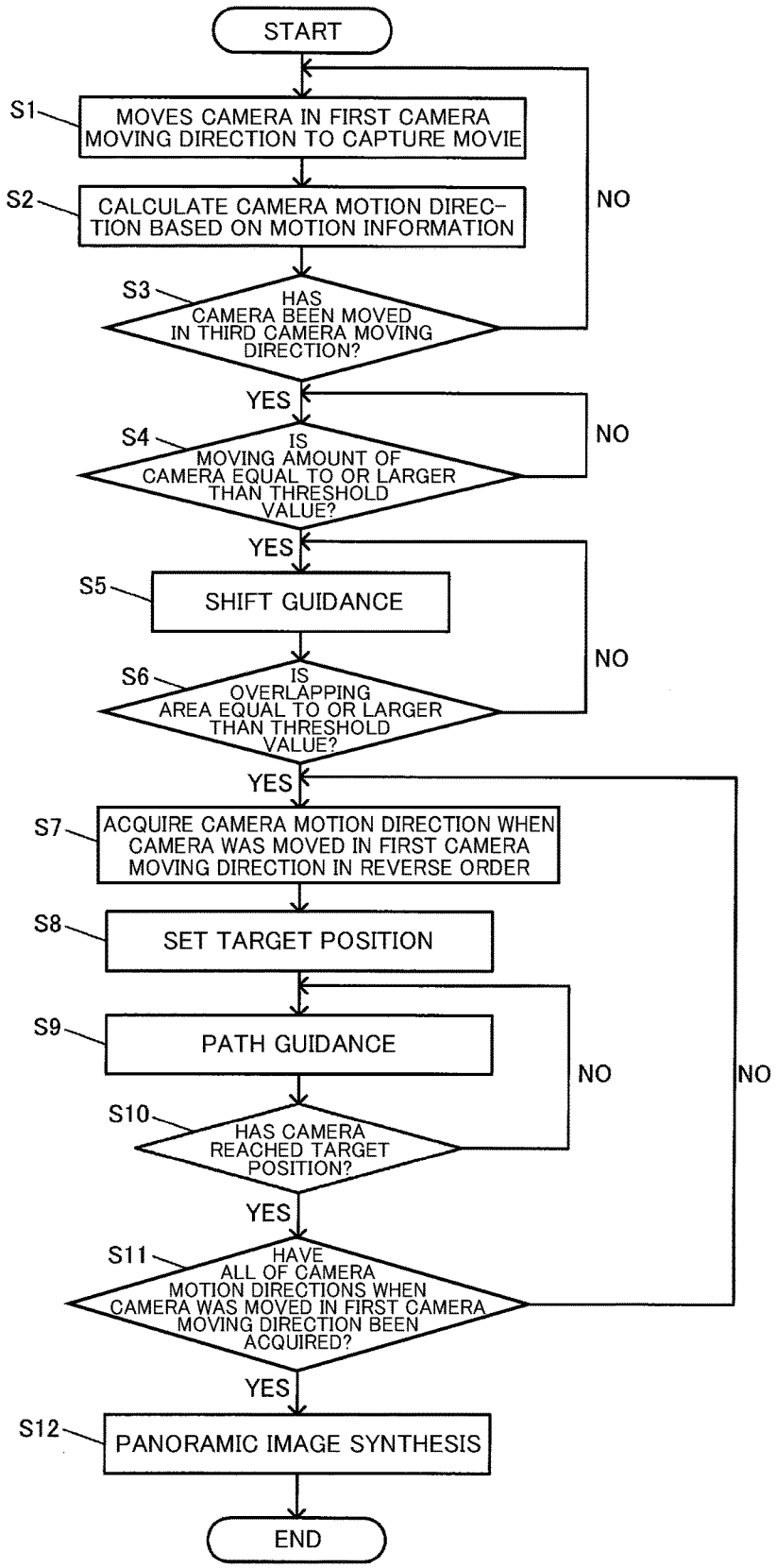
FIG. 10 is a flowchart illustrating the flow of a process according to one embodiment of the invention.

The flow of the process according to the embodiments of the invention is described below using the flowchart illustrated in FIG. 10. Note that the flow of the process is described below taking an example in which the panoramic image is generated from a movie. However, the panoramic image may not be generated from a movie. The panoramic image can also be generated in the same manner as described below when generating the panoramic image from continuously captured still images.

First, the user moves the imaging section in the first camera moving direction to capture a movie (S1). A motion vector calculated when encoding the captured movie is acquired as the motion information about the imaging section, and the camera motion direction is calculated based on the acquired motion information (S2).

Next, whether or not the imaging section has been moved in the third camera moving direction is determined (S3). When it has been determined that the imaging section has not been moved in the third camera moving direction, the step S1 is performed again. When it has been determined that the imaging section has been moved in the third camera moving direction, whether or not the moving amount in the third camera moving direction has exceeded a given threshold value is determined (S4). When it has been determined that the moving amount in the third camera moving direction has not exceeded the given threshold value, the process stands by until the moving amount in the third camera moving direction exceeds the given threshold value. When it has been determined that the moving amount in the third camera moving direction has exceeded the given threshold value, the shift guidance is presented (S5). The overlapping area of the still image currently captured by the imaging section and the still image captured when the imaging section was moved in the first camera moving direction is calculated, and the overlapping area is compared with a given threshold value (S6). When it has been determined that the overlapping area is less than the given threshold value, the shift guidance is presented (S5) so that the overlapping area becomes equal to or larger than the given threshold value.

When it has been determined that the overlapping area is equal to or larger than the given threshold value, the camera motion direction when the imaging section was moved in the first camera moving direction is acquired in reverse order (S7). The next target position of the imaging section is determined based on the direction opposite to the acquired camera motion direction (S8), and the path guidance that guides the user to move the imaging section to the target position is presented (S9). After presenting the path guidance information, whether or not the imaging section has reached the target position is determined based on the motion information (S10). When it has been determined that the imaging section has not reached the target position, the step S9 is performed again. When it has been determined that the imaging section has reached the target position, whether or not all of the camera motion directions when the imaging section was moved in the first camera moving direction have been acquired is determined (S11). When it has been determined that all of the camera motion directions when the imaging section was moved in the first camera moving direction have not been acquired, the step S7 is performed again. When it has been determined that all of the camera motion directions when the imaging section was moved in the first camera moving direction have been acquired, still images are sampled from the movie, and synthesized to generate a panoramic image (S12).

Although only some embodiments of the invention have been described in detail above, those skilled in the art will readily appreciate that many modifications are possible in the embodiments without materially departing from the novel teachings and advantages of the invention. Accordingly, all such modifications are intended to be included within scope of the invention. Any term cited with a different term having a broader meaning or the same meaning at least once in the specification and the drawings can be replaced by the different term in any place in the specification and the drawings. The configuration and the operation of the image processing system, the information processing device, and the information storage device are not limited to those described in connection with the above embodiments. Various modifications and variations may be made of the above embodiments.

What is claimed is:

1. An image processing system comprising:
 a head mounted device including an image acquisition section that consecutively acquires still images;
 a direction determination section that determines a camera moving direction, the camera moving direction being a moving direction of an imaging section during capture;
 a panoramic image generation section that performs a synthesis process of the consecutively acquired still images to generate a panoramic image;
 a guidance information generation section that generates guidance information, the guidance information being information that displays the moving direction of the imaging section to a user, wherein when the camera moving direction that corresponds to a given moving direction is a first camera moving direction, the camera moving direction that is opposite to the first camera moving direction is a second camera moving direction, and the camera moving direction that differs from the first camera moving direction and the second camera moving direction is a third camera moving direction; and
 a storage section that stores camera motion direction information, the camera motion direction information being information that indicates camera motion directions that are directions in which the imaging section is moved between still image capture timings,
 wherein the direction determination section determines the camera motion directions based on motion information about the imaging section acquired by a motion information acquisition section,
 wherein the direction determination section determines whether the camera moving direction is the first camera moving direction, the second camera moving direction, or the third camera moving direction when the imaging section is moved during capture,
 wherein the panoramic image generation section determines a synthesis position of a still image among the consecutively acquired still images based on the camera moving direction when the consecutively acquired still images were captured, and performs the synthesis process of the still image to generate the panoramic image,
 wherein the guidance information generation section, when the direction determination section has determined that the camera moving direction is the second camera moving direction, reads from the storage section in reverse order, the camera motion direction information of camera motion directions when the imaging section was moved in the first camera moving direction, and generates path guidance information as the guidance information, the path guidance information being information that guides the user to move the imaging section in directions respectively opposite to the camera motion directions indicated by the camera motion direction information read from the storage section,
 wherein the guidance information is displayed such that a first still image, which is from among the consecutively acquired still images and which is captured while the camera moving direction is the second camera moving direction, overlaps with a second still image, which is also from among the consecutively acquired still images and which is captured while the camera moving direction is the first camera moving direction, wherein the first and second still images are not captured at consecutive timings,
 wherein the guidance information generation section calculates a moving amount of the imaging section during capture after the camera moving direction has been changed to the third camera moving direction and calculates a moving amount of pixels corresponding to an identical image range before and after the imaging section is moved during capture by the calculated moving amount in the third camera moving direction, and
 wherein when the guidance information generation section determines that the moving amount of the pixels exceeds a given percentage of a dimension of a frame corresponding to the identical image range before the imaging section is moved during capture in the third camera moving direction, the guidance information generation section displays the guidance information to indicate a change timing to change the camera moving direction from the third camera moving direction to the second camera moving direction.

2. The image processing system as defined in claim 1, wherein the panoramic image generation section performs the synthesis process of the still image so that the still image has an overlapping area with another still image among the consecutively acquired still images that was used for a preceding synthesis process in the camera moving direction when said another still image used for the preceding synthesis process was captured to generate the panoramic image.

3. The image processing system as defined in claim 1, wherein the panoramic image generation section determines the synthesis position of the still image based on the camera motion directions, and performs the synthesis process of the still image to generate the panoramic image.

4. The image processing system as defined in claim 3, wherein the panoramic image generation section performs the synthesis process of the still image so that the still image has an overlapping area with another still image among the consecutively acquired still images that was used for a preceding synthesis process in a camera motion direction when said another still image used for the preceding synthesis process was captured to generate the panoramic image.

5. The image processing system as defined in claim 1, wherein the guidance information generation section generates shift guidance information as the guidance information that prompts the user to move the imaging section in the second camera moving direction at the change timing.

6. The image processing system as defined in claim 5, wherein the guidance information generation section: (i) acquires a camera moving amount equivalent value of the imaging section in the third camera moving direction when the direction determination section has determined that the camera moving direction has changed from the first camera moving direction to the third camera moving direction, (ii) determines whether or not the acquired camera moving amount equivalent value is equal to or larger than a given threshold value, and (iii) generates the shift guidance information that prompts the user to move the imaging section in the second camera moving direction when it has been determined that the camera moving amount equivalent value is equal to or larger than the given threshold value.

7. The image processing system as defined in claim 1, wherein the guidance information generation section determines that the imaging section has reached a target position of the imaging section indicated by the generated path guidance information when it has been determined that the imaging section has been moved to be positioned within an error tolerance distance range that includes the target position based on the motion information, and notifies a presentation section of the path guidance information that indicates a next target position of the imaging section.

8. The image processing system as defined in claim 7, wherein the guidance information generation section calculates difference information that indicates a difference between the target position of the imaging section indicated by the path guidance information and an actual position of the imaging section that has been moved, when the imaging section has been moved to be positioned within the error tolerance distance range, and corrects the path guidance information that indicates the next target position of the imaging section based on the difference information.

9. The image processing system as defined in claim 1, wherein the image acquisition section calculates a motion vector based on the motion information acquired by the motion information acquisition section, the motion vector being a vector that indicates the moving direction of the imaging section, and
wherein the image acquisition section calculates a timing at which an absolute value of one of a horizontal component and a vertical component of the motion vector started to become larger than an absolute value of the other component to be a still image acquisition start timing used to generate the panoramic image when it has been determined that the absolute value of the one of the horizontal component and the vertical component of the motion vector is continuously larger than the absolute value of the other component for a given time.

10. The image processing system as defined in claim 1, wherein the image acquisition section calculates a motion vector based on the motion information acquired by the motion information acquisition section, the motion vector being a vector that indicates a moving direction of the imaging section, and
wherein the image acquisition section calculates a timing at which a magnitude of the motion vector started to become equal to or less than a given threshold value to be a still image acquisition stop timing used to generate the panoramic image when it has been determined that the magnitude of the motion vector is continuously equal to or less than the given threshold value for a given time.

11. The image processing system as defined in claim 1, wherein the image acquisition section controls a shutter release timing of the imaging section to consecutively acquire the still images.

12. An information processing device comprising:
a direction determination section that determines a camera moving direction, the camera moving direction being a moving direction of an imaging section of a head mounted device during capture;
a panoramic image generation section that performs a synthesis process of still images that have been consecutively acquired by an image acquisition section to generate a panoramic image;
a storage section that stores the consecutively acquired still images and the generated panoramic image and that also stores camera motion direction information, the camera motion direction information being information that indicates camera motion directions that are directions in which the imaging section is moved between still image capture timings; and
a guidance information generation section that generates guidance information, the guidance information being information that displays the moving direction of the imaging section to a user, wherein when the camera moving direction that corresponds to a given moving direction is a first camera moving direction, the camera moving direction that is opposite to the first camera moving direction is a second camera moving direction, and the camera moving direction that differs from the first camera moving direction and the second camera moving direction is a third camera moving direction,
wherein the direction determination section determines the camera motion directions based on motion information about the imaging section acquired by a motion information acquisition section,
wherein the panoramic image generation section: (i) acquires the consecutively acquired still images from the image acquisition section when the imaging section was moved in the first camera moving direction, then moved in the third camera moving direction, and then moved in the second camera moving direction during capture, (ii) determines a synthesis position of a still image among the consecutively acquired still images based on the camera moving direction when the still image was captured, and (iii) performs the synthesis process of the still image to generate the panoramic image,
wherein the guidance information generation section, when the direction determination section has determined that the camera moving direction is the second camera moving direction, reads from the storage section in reverse order, the camera motion direction information of camera motion directions when the imaging section was moved in the first camera moving direction, and generates path guidance information as the guidance information, the path guidance information being information that guides the user to move the imaging section in directions respectively opposite to the camera motion directions indicated by the camera motion direction information read from the storage section, wherein the guidance information is displayed such that a first still image, which is from among the consecutively acquired still images and which is captured while the camera moving direction is the second camera moving direction, overlaps with a second still image, which is also from among the consecutively acquired still images and which is captured while the camera moving direction is the first camera moving direction, wherein the first and second still images are not captured at consecutive timings, wherein the guidance information generation section calculates a moving amount of the imaging section during capture after the camera moving direction has been changed to the third camera moving direction and calculates a moving amount of pixels corresponding to an identical image range before and after the imaging section is moved during capture by the calculated moving amount in the third camera moving direction, and wherein when the guidance information generation section determines that the moving amount of the pixels exceeds a given percentage of a dimension of a frame corresponding to the identical image range before the imaging section is moved during capture in the third camera moving direction, the guidance information generation section displays the guidance information to indicate a change timing to change the camera moving direction from the third camera moving direction to the second camera moving direction.

13. The information processing device as defined in claim 12, wherein the panoramic image generation section determines the synthesis position of the still image based on the camera motion directions, and performs the synthesis process of the still image to generate the panoramic image.

14. The information processing device as defined in claim 12, wherein the guidance information generation section generates shift guidance information as the guidance information that prompts the user to move the imaging section in the second camera moving direction at the change timing.

15. A non-transitory computer-readable storage device with an executable program stored thereon, wherein the program instructs a computer to perform functions comprising:
   determining a camera moving direction, the camera moving direction being a moving direction of an imaging section of a head mounted device during capture;
   performing a synthesis process of consecutively acquired still images to generate a panoramic image;
   generating guidance information, the guidance information being information that displays the moving direction of the imaging section to a user, wherein when the camera moving direction that corresponds to a given moving direction is a first camera moving direction, the camera moving direction that is opposite to the first camera moving direction is a second camera moving direction, and the camera moving direction that differs from the first camera moving direction and the second camera moving direction is a third camera moving direction;
   storing camera motion direction information in a storage section, the camera motion direction information being information that indicates camera motion directions that are directions in which the imaging section is moved between still image capture timings, wherein the camera motion directions are determined based on motion information that is acquired about the imaging section;
   acquiring the consecutively acquired still images when the imaging section was moved in the first camera moving direction, then moved in the third camera moving direction, and then moved in the second camera moving direction during capture;
   determining a synthesis position of a still image among the consecutively acquired still images based on the camera moving direction when the still image was captured;
   when it is determined that the camera moving direction is the second camera moving direction, reading from the storage section in reverse order, the camera motion direction information of camera motion directions when the imaging section was moved in the first camera moving direction, and generating path guidance information as the guidance information, the path guidance information being information that guides the user to move the imaging section in directions respectively opposite to the camera motion directions indicated by the camera motion direction information read from the storage section;
   displaying the guidance information such that a first still image, which is from among the consecutively acquired still images and which is captured while the camera moving direction is the second camera moving direction, overlaps with a second still image, which is also from among the consecutively acquired still images and which is captured while the camera moving direction is the first camera moving direction, wherein the first and second still images are not captured at consecutive timings;
   calculating a moving amount of the imaging section during capture after the camera moving direction has been changed to the third camera moving direction and calculating a moving amount of pixels corresponding to an identical image range before and after the imaging section is moved during capture by the calculated moving amount in the third camera moving direction;
   when it is determined that the moving amount of the pixels exceeds a given percentage of a dimension of a frame corresponding to the identical image range before the imaging section is moved during capture in the third camera moving direction, displaying the guidance information to indicate a change timing to change the camera moving direction from the third camera moving direction to the second camera moving direction; and
   performing the synthesis process of the still image to generate the panoramic image.

16. An image processing method comprising:
   consecutively acquiring still images;
   determining a camera moving direction, the camera moving direction being a moving direction of an imaging section of a head mounted device during capture;
   performing a synthesis process of the consecutively acquired still images to generate a panoramic image;
   generating guidance information, the guidance information being information that displays the moving direction of the imaging section to a user, wherein when the camera moving direction that corresponds to a given moving direction is a first camera moving direction, the camera moving direction that is opposite to the first camera moving direction is a second camera moving direction, and the camera moving direction that differs from the first camera moving direction and the second camera moving direction is a third camera moving direction;

storing camera motion direction information in a storage section, the camera motion direction information being information that indicates camera motion directions that are directions in which the imaging section is moved between still image capture timings, wherein the camera motion directions are determined based on motion information that is acquired about the imaging section;

determining whether the camera moving direction is the first camera moving direction, the second camera moving direction, or the third camera moving direction when the imaging section is moved during capture;

determining a synthesis position of a still image among the consecutively acquired still images based on the camera moving direction when the consecutively acquired still images were captured, and performing the synthesis process of the still image to generate the panoramic image;

when it is determined that the camera moving direction is the second camera moving direction, reading from the storage section in reverse order, the camera motion direction information of camera motion directions when the imaging section was moved in the first camera moving direction, and generating path guidance information as the guidance information, the path guidance information being information that guides the user to move the imaging section in directions respectively opposite to the camera motion directions indicated by the camera motion direction information read from the storage section;

displaying the guidance information such that a first still image, which is from among the consecutively acquired still images and which is captured while the camera moving direction is the second camera moving direction, overlaps with a second still image, which is also from among the consecutively acquired still images and which is captured while the camera moving direction is the first camera moving direction, wherein the first and second still images are not captured at consecutive timings;

calculating a moving amount of the imaging section during capture after the camera moving direction has been changed to the third camera moving direction and calculating a moving amount of pixels corresponding to an identical image range before and after the imaging section is moved during capture by the calculated moving amount in the third camera moving direction; and when it is determined that the moving amount of the pixels exceeds a given percentage of a dimension of a frame corresponding to the identical image range before the imaging section is moved during capture in the third camera moving direction, displaying the guidance information to indicate a change timing to change the camera moving direction from the third camera moving direction to the second camera moving direction.

* * * * *